Patented July 25, 1933

1,919,727

UNITED STATES PATENT OFFICE

OTTO JORDAN, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF LACQUERS, ARTIFICIAL MASSES AND SOLUTIONS OF THEIR CONSTITUENTS

No Drawing. Application filed January 31, 1929, Serial No. 336,647, and in Germany February 11, 1928.

The present invention relates to the production of lacquers, artificial masses and solutions of their constituents.

I have found that very valuable artificial masses, lacquers and varnishes, such as cellulose ester lacquers, oil varnishes, priming compositions and the like artificial masses are obtained by dissolving the ingredients or a part thereof in aliphatic derivatives of 1.4-dioxane, in particular, alkyl-1.4-dioxanes, for example dimethyl-1.4-dioxane with a boiling point of from 115° to 117° C. or diethyl-1.4-dioxane with a boiling point of from 150° to 155° C. These bodies or mixtures of the same can be prepared, for example, by treating with a dehydrating catalyst the corresponding glycols, obtainable, for example, by working up gases obtained in cracking carbonaceous materials, such as oils or tars, and possess more valuable properties as solvents than dioxane itself. The alkyl-dioxanes employed can be prepared from the corresponding glycols by condensation with the aid of acid condensing agents, such as sulphuric acid, phosphoric acid, zinc chloride and the like, in the same manner as dioxane is obtained from ethylene glycol. Thus methyl-dioxane can be obtained from two molecular proportions of 1.2-propylene glycol and ethylene glycol and corresponds to the structural formula

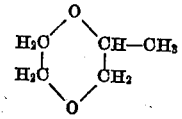

dimethyl-dioxane

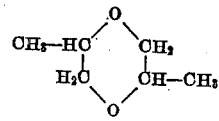

being obtainable from two molecular proportions of 1.2-propylene glycol, and diethyl dioxane

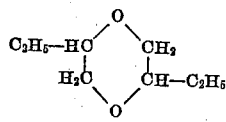

being obtainable from two molecular proportions of 1.2-butylene glycol. Mixtures of glycols from the aforesaid sources furnish mixed alkyl dioxanes as described with reference to mono-methyl dioxane. The said products are good solvents for organic film-forming materials, such as cellulose derivatives, for example cellulose esters or cellulose ethers, such as ethyl-, propyl- or benzyl-cellulose in particular nitro-cellulose, and for very many natural and artificial resins, softening and gelatinizing agents, oils, dyestuffs and siccatives, as are employed in the manufacture of lacquers and artificial masses containing the aforesaid constituents. The softening and gelatinizing may be chosen as desired from the groups of aryl phosphates, phthalic esters, such as dibutyl phthalate, acetanilid camphor, castor oil, toluene sulphonic esters, butyl stearate and so on, and the oils may consist of linseed oil, China-wood oil, Perilla oil and the like. Suitable siccatives are, for example, zinc manganese, naphthenate, lead naphthenate and the like.

The dioxane derivatives are miscible with each other and with most other solvents, and these mixtures, which may also contain diluents and other additions, are also advantageously adapted for use as solvents for the aforesaid purposes.

The said 1.4-dioxane derivatives show the special advantage over many solvents hitherto employed in the manufacture of lacquers and the like of possessing only quite a slight and pleasant odor and having the property which for many purposes is advantageous, of being less readily volatile than unsubstituted 1.4-dioxane. In contrast to this they are only slightly soluble in water; this property is in many cases of considerable importance for the said purpose.

When preparing nitrocellulose solutions or lacquers with the aid of aliphatic 1.4-dioxane derivatives it is advisable also to employ alcohols, for example ethyl alcohol, as diluents, especially when employing nitrocellulose which is very easily soluble in alcohol. The properties of such lacquers can be varied within wide limits by the simultaneous employment of other solvents of a great variety of kinds, for example esters of monohydric alcohols, such as the acetates of ethyl, butyl, amyl or cyclohexyl alcohol, ketones, esters or ethers of polyhydric alcohols, especially of glycols and the like, such as the mono-ethers of ethylene or propylene glycol with methyl, ethyl, isopropyl or butyl alcohol, the mono-methyl or mono-ethyl ether of butylene glycol and the acetates of the aforesaid ethers and also the mono- or di-acetates of ethylene, propylene or butylene glycol, and may thus be adapted for employment for different purposes, such as spraying, dipping, applying with a brush and the like.

Acetyl cellulose which is soluble in acetone readily dissolves in the warm in 1.4-dioxane derivatives. By the addition of alcohol and frequently also of small quantities of water to the dioxane derivatives, solution can be effected even in the cold. The composition of such solutions can be varied to a very far degree by simultaneously employing other solvents, such as acetone, ethylene glycol monomethyl ether acetate, cyclohexanone, methyl glycolic acid, methyl ester and the like.

The solvent power of the dioxane derivatives is equally good as regards a great variety of resins; for example, sandarac, mastic, elemi, colophony, Congo copal, kauri copal, ester gums, condensation products of ketones, for example of cyclohexanone, cumarone and indene resins, polymerized vinyl esters and the like are soluble, and thus it is possible with the aid of the said solvents to prepare lacquers and the like which simultaneously contain nitrocellulose or cellulose ethers and resins compatible therewith of any desired composition.

When only small quantities of liquid ingredients are incorporated with the aforesaid more or less plastic constituents highly viscous solutions or plastic masses can be prepared which after a suitable moulding or the like operation yield highly uniform and homogeneous artificial masses excellently suitable for all the industrial purposes for which celluloid or similar products are employed.

The following examples will further illustrate the nature of the invention, but the invention is not restricted thereto. The parts are by weight.

*Example 1*

100 parts of pyroxylin moistened with commercial ethyl alcohol are dissolved in a solvent mixture consisting of 600 parts of a mixture of dimethyl- and diethyl-1.4-dioxane, 50 parts of butanol and 250 parts of alcohol. The solution gives clear transparent films.

Suitable quantities of resins, softening or gelatinizing agents, soluble dyestuffs or pigments, fillers and the like may be added to the solution. In this connection it is advantageous when preparing covering lacquers to incorporate the dyestuff in such a finely divided state that when the solution is diluted they are not deposited or only negligibly so.

*Example 2*

10 parts of ethyl cellulose soluble in benzene are dissolved in a mixture of 10 parts of dimethyl or diethyl dioxane or a mixture of both, 70 parts of benzene, 50 parts of toluene and 10 parts of ethyl alcohol. A perfectly clear solution is obtained which furnishes highly glossy coatings which are resistant to acid and alkaline agents.

*Example 3*

15 parts of a nitrocellulose, solutions of which possess a low viscosity, and which is soluble to a high degree in alcohol, are dissolved together with 1.5 parts of bleached shellac in a mixture of 10 parts of dimethyl or diethyl dioxane or a mixture of both, 60 parts of ethyl alcohol, 7.5 parts of butanol and 7.5 parts of tricresyl phosphate. The solution, into which, if desired, pigments, such as titanium white, can be incorporated by stirring, is suitable for the most varied purposes, for example, as a brushing lacquer. In this case it is often advantageous to incorporate a solvent with a higher boiling point, such as an ethylene glycol mono-alkyl-ether or the like, in order to reduce the volatility of the solvent mixtures. The employment of the homologues of dioxane offers the special advantage of a simultaneous dissolution of resins, the quantities added being chosen in each case corresponding to any special requirements.

*Example 4*

200 parts of an acetylcellulose soluble in acetone, 60 parts of triphenyl phosphate and 20 to 40 parts of dimethyl phthalate are dissolved, while gently warming, in a mixture consisting of about 100 parts of a mixture of dioxane and the homologues of dioxane, 300 parts of commercial ethyl alcohol, 300 parts of benzene and from 20 to 40 parts of water, and adding, if desired, any dyestuff or coloring material.

The tough product can be worked into a plastic mass for example by means of warmed rollers, the plastic mass being then converted into products similar to celluloid and the like.

What I claim is:

1. A composition of matter comprising an organic film-forming material and an alkyl dioxane selected from the group consisting of dimethyl- and diethyl-dioxane.

2. A composition of matter comprising a cellulose derivative soluble in organic solvents and an alkyl dioxane selected from the group consisting of dimethyl- and diethyl-dioxane.

3. A composition of matter comprising a cellulose derivative soluble in organic solvents, an alkyl dioxane selected from the group consisting of dimethyl- and diethyl-dioxane and another organic solvent.

4. A composition of matter comprising a cellulose derivative soluble in organic solvents, an alkyl dioxane selected from the group consisting of dimethyl- and diethyl-dioxane, another organic solvent and a plasticizing agent.

5. A composition of matter comprising a cellulose derivative soluble in organic solvents, an alkyl dioxane selected from the group consisting of dimethyl- and diethyl-dioxane, another organic solvent and a resin.

6. A composition of matter comprising a cellulose derivative soluble in organic solvents, an alkyl dioxane selected from the group consisting of dimethyl- and diethyl-dioxane, another organic solvent, a softening agent and a resin.

7. A composition of matter comprising a cellulose ester, an alkyl dioxane selected from the group consisting of dimethyl- and diethyl-dioxane and another organic solvent.

8. A composition of matter comprising a cellulose ester, a cellulose ether, an alkyl dioxane selected from the group consisting of dimethyl- and diethyl-dioxane and another organic solvent.

9. A composition of matter comprising nitrocellulose and an alkyl-dioxane selected from the group consisting of dimethyl- and diethyl-dioxane.

10. A composition of matter comprising nitrocellulose, a resin and a mixture of two different alkyl-dioxanes selected from the group consisting of dimethyl- and diethyl-dioxane.

11. A composition of matter comprising acetyl cellulose and an alkyl-dioxane selected from the group consisting of dimethyl- and diethyl-dioxane.

12. A composition of matter comprising a cellulose ether, soluble in organic solvents, and an alkyl-dioxane selected from the group consisting of dimethyl- and diethyl-dioxane.

13. A composition of matter comprising a cellulose derivative, soluble in organic solvents, and a mixture of an alkyl-dioxane selected from the group consisting of dimethyl- and diethyl-dioxane with dioxane.

14. A composition of matter comprising a cellulose derivative, soluble in organic solvents, and a mixture of dimethyl-dioxane with diethyl-dioxane.

OTTO JORDAN.